United States Patent [19]
Miller et al.

[11] Patent Number: 5,652,717
[45] Date of Patent: Jul. 29, 1997

[54] APPARATUS AND METHOD FOR COLLECTING, ANALYZING AND PRESENTING GEOGRAPHICAL INFORMATION

[75] Inventors: Raymond M. P. Miller, Scottsdale; Wilson W. Orr, Fountain Hills, both of Ariz.

[73] Assignee: City of Scottsdale, Scottsdale, Ariz.

[21] Appl. No.: 735,336

[22] Filed: Oct. 22, 1996

Related U.S. Application Data

[63] Continuation of Ser. No. 285,830, Aug. 4, 1994, abandoned.
[51] Int. Cl.$^6$ .................................................. G06T 17/50
[52] U.S. Cl. .................................................. 364/578
[58] Field of Search .................................. 364/578, 564, 364/512, 413.3, 900 MS File, 920.3, 200 MS File, 221.2; 324/323; 395/929, 920; 422/900; 434/130, 299

[56] References Cited

U.S. PATENT DOCUMENTS

| | | | |
|---|---|---|---|
| 4,868,771 | 9/1989 | Quick et al. | 364/578 |
| 4,890,249 | 12/1989 | Yen | 364/578 |
| 5,005,147 | 4/1991 | Krishen et al. | 364/578 |
| 5,307,292 | 4/1994 | Brown et al. | 364/564 |
| 5,329,464 | 7/1994 | Sumic et al. | 364/512 |
| 5,375,074 | 12/1994 | Greenberg et al. | 364/578 |

OTHER PUBLICATIONS

"A Three–Dimensional/Stereoscopic Display and Model Control System for Great Lakes Forecasts", by C. Yen, K. Bedford, J. Kempf and R. Marshall, IEEE Visualization Conference, 1990, pp. 194–201.

"Visualizing n–Dimensional Implications of Two–Dimensional design Decisions", by S. Ervin, IEEE Visualization Conference, 1992, pp. 356–360.

"Computer–Aided Modeling for Interference Analysis in Urban Areas", by T. Mizuike et al, GLOBECOM '92: IEEE Global Telecommunications Conference, 1992, pp. 1858–1864.

"Machine Learning from Remote Sensing Analysis", by D. Charebois, D. Goodenough and S. Matwin, IEEE, Remote Sensing for the Nineties, 1993 (IGARSS), pp. 165–172.

"ADSM—An Automated Distribution System Modeling Tool for Engineering Analyses", by X. Wei, Z. Sumic and S. Venkata, IEEE, Transmission and Distribution Conference, 1994, pp. 46–52.

"Geographic Information Systems: Are They Decision Support Systems?", by L. Murphy, IEEE, System Sciences, 1995 Annual Hawaii Int'l Conference, vol. IV, pp. 131–140.

*Primary Examiner*—Kevin J. Teska
*Assistant Examiner*—Russell W. Frejd
*Attorney, Agent, or Firm*—Cahill, Sutton & Thomas P.L.C.

[57] ABSTRACT

Geographically related information is received from a plurality of sources, such as orbiting satellites, reconnaissance aircraft, photographs, maps, remote computer terminals, and the like, and is processed and integrated into a generic GIS to provide expanded information due to vast amount of data relating to geographic locations to increase the amount if information available and derivable. The processed data may be stored for later use, or it may be presented visually on a computer screen or printed to provide a hard copy. Interactive terminals may be used to provide data as desired in a real time setting. These data are manipulated to, (A) provide information of current value and utility to the user, and (B) to perform simulation of local/regional future scenarios to assess the sustainability of particular courses of action. The latter requires the merger of remote sensed, radar, or lidar imagery with change models, proposed development, video imagery and basic GIS mapping/ attribute files manipulated with digital and image simulation software.

24 Claims, 2 Drawing Sheets

5,652,717

APPARATUS AND METHOD FOR COLLECTING, ANALYZING AND PRESENTING GEOGRAPHICAL INFORMATION

This is a continuation of patent application Ser. No. 08/285,830, filed Aug. 4, 1994, by Raymond M. P. Miller and Wilson W. Orr, and entitled "APPARATUS AND METHOD FOR COLLECTING, ANALYZING AND PRESENTING GEOGRAPHICAL INFORMATION " now abandoned.

BACKGROUND OF THE INVENTION

1. Field of the Invention

This invention relates to the collecting and analyzing of various geographical data, and, more particularly, to the collecting or gathering, analyzing, and integrating of geographical, geophysical, atmospheric, surface, subsurface, spatial, and environmental data, including the extraction of specific types of information and the display or presentation of the information for various users.

2. Description of the Prior Art

Heretofore data has largely been gathered manually by surveying, visual observation, photography, in situ measurements and extrapolation, or otherwise manually acquiring data and manually inputting the data into a computer system, usually a geographic information system. Visual simulations of various decision outcomes are generated manually, even with the assistance of computer assisted drawings. Visual simulations into the long term future relating to geographic data have not heretofore been attempted.

SUMMARY OF THE INVENTION

This invention discloses an enhanced geographic information system which directly links hyperspectral, high resolution satellite, aircraft remote sensed data, such as radar, lidar, and sidar, imagery, and other geographic data automatically and continuously and in real time, and analyzes the information for visual presentations. The data may be entered from a variety of sources, including maps, etc, which may be old, and the old information is processed and integrated with new information or data to provide correct, up to the minute geographic information.

The geographic material is, of course, processed by computer software and may be outputted to computer terminals, printers, data files, other computer systems, etc., as desired.

Among the objects of the present invention are the following:

To provide new and useful apparatus for presenting geographic information to a user;

To provide new and useful apparatus for presenting geographic information to a plurality of users in a theater environment;

To provide a new and useful method of gathering, analyzing, and presenting geographical information;

To provide new and useful apparatus and method for simulating future outcomes for users making current decisions based on the principles of sustainability;

To provide a new and useful method for gathering geographical information from a plurality of sources and integrating the gathered information; and To provide a new and useful method for analyzing information gathered from a plurality of sources and visually present the analyzed information in response to a user's desires.

DESCRIPTION OF THE PREFERRED EMBODIMENT

Figure 1:
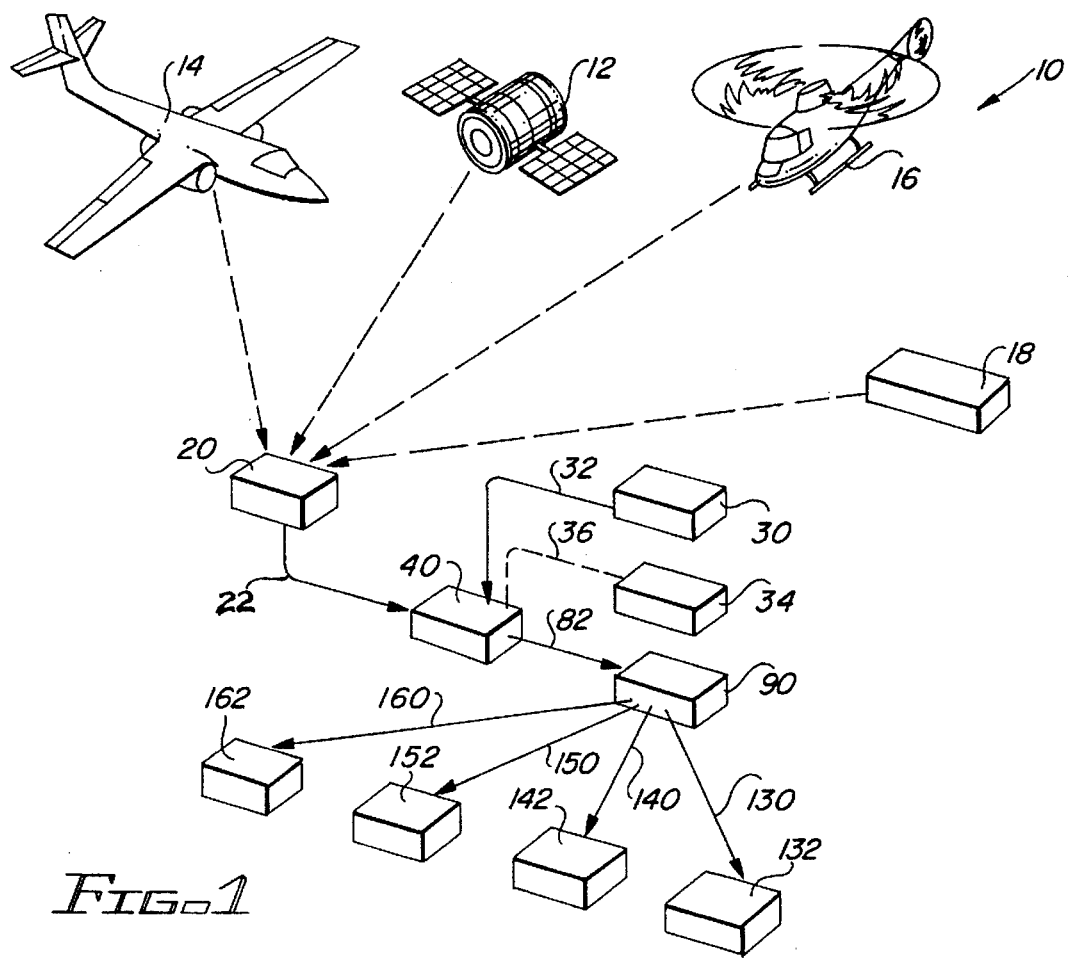
FIG. 1 is a block diagram schematically representing the information gathering and routing system involved in the present invention.
Figure 2:
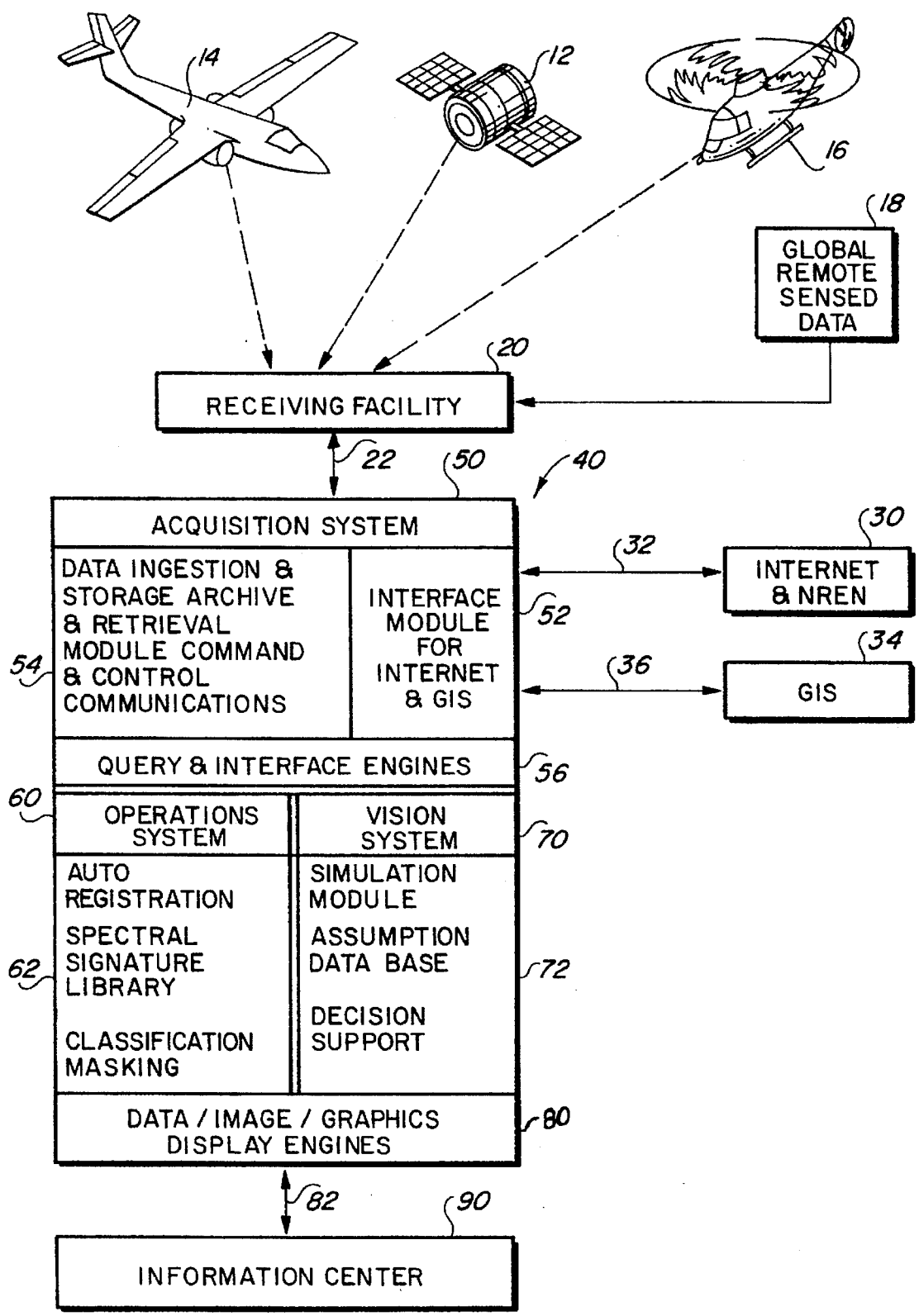
FIG. 2 is a block diagram detailing some of the elements illustrated in FIG. 1.

FIG. 1 comprises a block diagram schematically illustrating an enhanced geographical information system 10 of the present invention. The overall features of the system 10 are shown in FIG. 1. FIG. 2 comprises another block diagram of the system 10, illustrating some of the hardware and software modules which are illustrated broadly in FIG. 1. For the following discussion, reference will be made to FIGS. 1 and 2.

FIG. 1 is a block diagram schematically illustrating the gathering of the information processed as part of the information system 10 of the present invention and the flow of the information after the gathering, including the processing and distribution of the information to ultimate users.

Information in several different formats is illustrated as being received by a data reception ground station 20, which may include satellite reception station, from several different sources. The sources include, for illustrative purposes, an earth circling satellite 12, an aircraft 14 which may be a high altitude reconnaissance aircraft, and a helicopter 16. The helicopter may schematically represent a local aircraft or appropriately located fixed sensors, such as atop a mountain or a tall building, etc., gathering purely local information, as opposed to the reconnaissance aircraft 14, which may cover a relatively large area for a government agency, etc.

For example, the aircraft 14 may provide multispectral radar, and lidar information, infra red data, or photographs, or other information. On the other hand, the local aircraft, or helicopter 16, may provide primarily photographic and video information of the local area or some part or parts thereof.

The satellite 12 may also provide multispectral radar data, radar data, photographic information, infra red data, lidar data, sidar data and the like. Obviously, there are many kinds or sources of data that are now available, and in all probability more types of data will be forthcoming in the future. With contemporary technology, these data from whatever source may be transmitted to earth stations, such as the station 20.

With respect to terminology, it will be noted that multispectral data or information is generally considered passive system derived information. It is simply normal reflected solar radiation. Radar, lidar, and sidar are typically considered active system derived information. A system sends out a signal and looks for a received signal in response to the sent signal.

Global remote sensed information and data, such as GPS and global climate change models, is received also by the receiving facility 20. A block 18 represents the global remote sensed data originating source(s).

Multispectral information and other data from whatever source is received, integrated, and processed. The processing includes the overlaying of the information so that decisions may be based on data that is complete and accurate.

From the station 20, the information is transmitted through appropriate transmission elements 22, such as wireless, fiberoptics, or cable elements to a central location 40. The central location or station 40 includes the software and hardware for processing the received information included are three primary systems, discussed in detail below. They included an acquisition system 50, an operations system 60, and a vision system 70. The acquisition system 50 includes an interface module 52 for information from Internet and GIS stations 30 and 34, respectively. The stations 30 and 34 provide regional and global information. The information flows into the station 30 from any number of centers or sources. The center 30 receives information through telecommunications connections, well known and understood in the art.

From the center 30, data is transmitted to the interface module 52 by an appropriate communications or transmission element 32.

Similarly, geographic information from a station or center 34 is appropriately transmitted to station 40 via an appropriate medium 36.

Data is routed to the appropriate hardware and software elements, as desired or required. The information is analyzed, collated, and processed appropriately for use. The "use" may be multiple uses, depending on the users. That is, different users desire different information, and the information is processed to provide multiple users with virtually any type of information from the gathered data.

Figure 3:
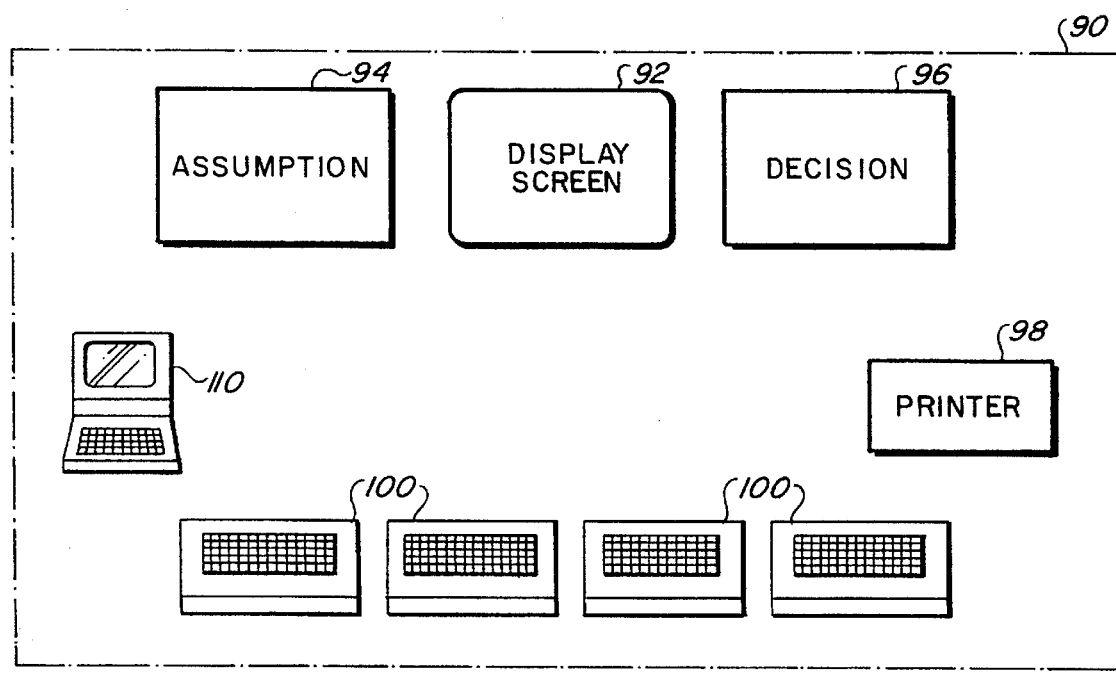
FIG. 3 is a block diagram illustrating the presentation of the information gathered and processed by the present invention.

Data may be received from numerous sources, as indicated above, such as from aerial or space based sensor platforms, or by land line, by microwave from global remote data, by change model libraries, or from any other source. Data may be fed directly to the central location 40 in real time or near real time. Remote sensed data, such as multi-spectral radar, lidar, and sidar, is routed to the central location 40 where it is processed, manipulated, and archived. The data may be retrieved, further manipulated, and presented in an interactive venue, designed for group decision support, by software and hardware elements, as illustrated in FIG. 3 and as will be discussed below.

Three primary systems are integrated, as best shown in FIG. 2. One system is the acquisition system 50, the second system is the operations system 60, and the third system is the vision or visioning system 70.

The acquisition system 50 includes an accessory program 52 which interfaces with a generic geographic information system (GIS) 34. The program provides the interface software for subroutines with the generic GIS and the communications software for direct linkage with remote sensors. This system may link continuously with several different sensor instruments on satellites or aircraft which provide selective hyperspectral scanning of the electromagnetic spectrum, radar imagery which may be multi-polarized, and laser imagery (lidar) which may be similarly polarized. This system may then provide instantaneous or prerecorded information of value to the users.

Initial processing of raw multi-spectral, real time data from aerial and space based platforms is performed within this system. This system includes the hardware necessary to run the software and to facilitate data movement.

Data from Internet and NREN 30 is also initially processed by the interface module 52. The module 52 communicates with a module 54 which provide various functions, such as data ingestion and storage, archive and retrieval, command and control, and communications.

A plurality of direct display screens 92 may be used in a theater setting 90 with interactive keyboards/LCD displays 100, 102, 104, 106 for a plurality of users, as shown in FIG. 3. This system provides the hardware and software environment by which the following two elements interact with the user.

1. Data ingestion, storage, archiving, retrieval, command and control software are included with communications protocols in the module 54.

This module accepts the initial data, performing identification, and archiving necessary to respond to queries from a user interface module 56 described below. This system recognizes any data, whether multi-spectral, radar, or lidar, etc.

The integrated user interface module 56 provides an integrated interface for query and display of city's GIS data, remote sensed data, imagery and all accessible data on connected computer systems operated by others (third parties). The software interface is an integration of several data access and display engines and includes the following:

1. GIS database query engine
2. GIS graphic and image query engine
3. Internet access and network access engine
4. Image and GIS graphic display engine
5. Data display engine This integrated user interface module subroutine 56 also integrates these server modules. Links are established among the engines, allowing the user to switch between functions as necessary. For example, a user may wish to see the aerial photography for a one mile buffer around a specific land address.

The system passes the information to the database query engine which locates the appropriate records. A unique identifier and task request is sent to the graphics engine to expand the geometry of the subject parcel of land for the one mile radius.

Finally, the system passes the geometrics of the buffer to the image display engine and the data display engine which extracts only the portion of the image needed and sends the results on the screen for display.

The operations system 60 provides for remote sensed data transfer, manipulation, and display for current operations and user functions through software. Some of the functions are illustrated in block 62. The essential functions or sub modules for the operations system 60, as listed in block 62, include:

1. Automatic registration of multi-spectral, radar, or lidar imagery:

This module contains the subroutines necessary to automatically identify the data imagery type and to auto register, or align, this imagery or attribute information with the base GIS.

The GIS database provides known ground features to provide overall control points for rectification of the imagery. Only features with pronounced active or passive signatures, static physical characteristics and appropriate geographic locations will be identified, such as a canal, tree, vehicle, or building, etc. An algorithm then analyzes the imagery and matches the known ground control shapes, transferring the coordinate geometry of the GIS features to the given image. This operation may be done through several correcting iterative processes by increasing the number of ground control features each time until an acceptable deviation is achieved.

2. High resolution multi-spectral, radar, and lidar imaging signature libraries:

This library provides reference data for atmospheric, land surface, and subsurface features, vegetation, life forms, conditions, and attributes within any desired region, such as, for example, the southwestern United States Region. This is a reference library for comparison with new remote sensed data, permitting feature identification, whether atmospheric, land surface, or subsurface.

GIS registered, high resolution, multi spectral, and radar or lidar imagery is ground truthed and synthesized to build an optimal signature library. The imagery is superimposed with known features within the GIS database, such as pavement, roof tops, etc., to determine the most common signature return for the given feature.

Since many factors can affect the signature return of any given feature, such as angle or pitch of the camera, shadows, etc., variances in the signature library occur. These variances are mathematically calculated to determine allowable tolerances within the signature band for each feature. Each spectral band within the spectral range for a given feature is examined for return values and optimally predictive values are calculated. This depicts the most common spectral return for the given band.

Next, tolerances are calculated by finding the minimum and maximum values in which a certain percentage of the returns for a given band belong. Finally, the signature library elements are tested and verified against or with known signatures for the regions known imagery to insure the classification accuracy of the data.

3. Classification module:

This module interprets the data stream and is equipped to recognize atmospheric, surface, and subsurface constituent features and attributes by spectral signature or reflected image comparison with reference to the signature library discussed above.

4. Masking module:

This module scans the data to produce an image which will present special features, such as a roof type or hydrant location, for example, and search for a given signature or indication, such as a particular pollutant, vegetation type, land characteristic, attribute, or object, or for a given coordinate set with a listing of selected attributes.

Following classification and/or masking, data are sent to the vision system or to an integrated user interface module, discussed below, for display and dissemination to a user. Data may be returned to the vision system 70 repeatedly for additional processing, as desired. Geographical addressing, coordinate selection, attribute queuing, and zoom or magnification features are contained within this module.

General applications developed using the vision system 70, as illustrated by a block 72, include:

1. Environmental change monitoring, compliance, and enforcement.
2. Transportation monitoring, analysis, and planning.
3. General planning, growth assessment, and management.
4. Zoning and building code enforcement.
5. Public protection and emergency/disaster response services.

Sample applications of this vision system, as referred to above, include hazardous materials dumping by type, location, and time, city (or county) police (law enforcement), transit, service, utility, or other vehicle location and status, watershed status, impending weather related events, regionally coordinated disaster incident management, traffic vehicle counts by time of day and location, tracking of vehicles and other biological and non-biological objects or entities, transportation planning, zoning monitoring and enforcement, crime evidence gathering, development plan review and tracking, air quality analysis, sources and movement of pollutants, long term trends, construction progress monitoring, and permit and other violations.

The visioning system 70 may provide dynamic visual and financial simulations of a region's future, given an assumption set and a predetermined series of development or policy decisions. This element is intended to project into a long range time frame and incorporate global change data through a high speed data channel. Global data is regionalized, utilizing special software to combine emerging local climatic models with larger data sets. This subprogram accesses global environmental information data and modeling to assist a government in developing long term strategies which integrate with global environmental trends and emerging guidelines for sustainable development.

Simulation

Digital image manipulation and simulation capability utilizes advanced processing capabilities applied to environmental, economic, and social models developed as part of the module subroutines.

Optical image manipulation and simulation also utilizes advanced processing, but filters the image of elements not requiring update for the next image. An image library is established for a local community to use for fly through/bys and "what if" scenario generations.

Assumption Set and Database

Simulation scenarios derive from a set of assumptions, regarding, in part:

Global/regional/local environmental factors (climate change, costs assigned to pollutants, new pollutants, totally internalized resource costs);

Global/regional/local economic factors (rate of inflation, interest rates, sources of GNP and local incomes, new products and specification, existing material and product performance specifications, areas, tax rates); and Global/regional/local social, cultural, demographic factors (population forecasts, health costs, educational levels and provisions).

Decision Support Module

Simulation scenarios depend on the policy and development decisions made by a community, government, or user organization. These are categorized in this module to include likely outcomes for a variety of policies, development alternatives, and infrastructure projections with regard to cost, usage rates, and life cycle costing of materials.

This module includes group decision support software which may be user confidential and individually interactive at each user's console 100, (see FIG. 3), and at remote locations. This is graphically portrayed in FIG. 3 as a city information center 90 which serves citizen, council commission, senior management/planning meetings, etc. Obviously, this facility may be adapted to various user groups or organizations requiring the integration of multiple data sets, imagery, and group decision support software.

The entire system is appropriately connected, such as by fiber optics, to all appropriate user departments and offices to create a virtual network which integrates across user groups. As the national "Information Highway" is developed, the system may be connected to include other, or more, remote locations.

Use of the geographical information discussed above is illustrated in FIG. 3, which comprises a block diagram of one type of information display or use center 90 for disseminating the information gathered and processed.

The center 90 includes a plurality of interactive consoles 100 connected to the center 40 by appropriate elements. In FIG. 1, a plurality of communications lines 130, 140, 150, and 160 are illustrated as extending to different centers 132, 142, 152, and 162, respectively where the gathered and processed information may be used by users. One such user is the center 90, connected to the center 40 by an appropriate communications line 82 from data/image/graphics display events 80. The block 80 represents the software and hardware which interfaces with the center 90 and the center 40. It will be understood that the various modules, engines, etc., within the center 40 communicate with each other as required to analyze, retrieve, etc., the data as requested by users at the consoles 100 . . . 106, etc.

At the front of the center 90, and in front of the consoles 100, is a large screen 92. By use of the consoles 100, the users of the consoles may call up and have displayed desired information on the screen 90. Moreover, the information displayed on the screen 90 may be manipulated and otherwise used or varied as desired. A master control console or facilitator console 110 is also shown in FIG. 3.

Some examples of applications of the present invention are set out below. The examples are illustrative only, and not exclusive.

Different users may sit at the consoles 100. The facilitator console 110 may provide assistance for the users at the consoles 100.

Hard copies of data may be provided by a plotter, printer 98 or similar image/data rendering device 98, or transmitted to a playback device for later usage, as desired.

On opposite sides of the display screen 92 are an assumption screen 94 and a decision screen 96. The purpose of the screens 94 and 96 is to aid the users in making decisions based on provided data. The assumptions may include resource, pollutant costs as a minimum in arriving at proper decisions. The decision screen will display the chosen decision tree, generally regarding changes to the natural environment. The display screen 92 will display visually and dynamically the long term results of the proposed changes.

Returning to FIG. 1, remote centers 132, 142, 152, and 162 are shown. The remote centers may represent other city departments, county or state agencies, private individuals or entities, schools and universities, and federal agencies, etc., tied into or part of the geographical information system 10.

EXAMPLE NO. 1

An "old" map shows water meters and sewer manholes at specific locations on a given street. With a hand held GIS transmitter, a person may walk along the street and activate the GIS transmitter at the water meters and manholes. GIS satellites receive the transmissions and relay the coordinates of the exact locations from where the transmissions were sent. The information is processed and is used to verify the "old" information and to correct any errors. The "new" information thus received and processed provides correct location information for the various water meter and sewer manholes.

EXAMPLE NO. 2

A new subdivision is planned for a section of land which includes hills, dry water courses and certain kinds of desired vegetation. The section of land has been photographed, etc., and the information is in the system memory. The information on the desired section is brought up on a computer screen and the information is analyzed. Appropriate printouts may be made for detailed analysis.

The information provided includes details on the vegetation so that lot lines, roads, etc., may be plotted to have minimum adverse effect on the vegetation and on the natural water courses, etc.

EXAMPLE NO. 3

Aerial photographs of an area are processed with maps to show correct lot boundaries, misaligned walls and fences, and other desired information.

EXAMPLE NO. 4

Radar imagery is preprocessed and auto registered to a GIS mapping system which overlays parcel property lines. The resulting image can be automatically interpreted or "read" to determine the surface area and percent slope on any given ownership parcel. This yields buildable/ unbuildable percentages and ultimately derives a slope analysis for the parcel. These parcels, and their attributes, can be aggregated to provide a basis for transaction negotiations, tax assessment, and other values which are slope dependent. The radar data provides highly accurate elevation data from the which the slope composite imagery is constructed.

EXAMPLE NO. 5

An agency responsible for reviewing, revising, approving, monitoring construction progress, and otherwise dealing with land use and architectural plans may require these to be submitted in Computer Assisted Design (CAD) format on magnetic or optical media. Plans thus digitized may be merged into the GIS resident, remote sensed imagery to create dynamic and realistic presentations of the finished development of a capital improvement project.

The simulation software merges the digitized plan with change models and simulate visually how the project will look in the distant future. Plan check submodules approve, or disapprove the project based on its long term impacts as determined by this simulation capability.

EXAMPLE NO. 6

The visual simulations of Example 5, above, may be integrated with economic, social, and environmental cost forecasts to determine a project's impact on the sustainability of the community, or ability to function without negatively impacting the future wellbeing of the community.

EXAMPLE NO. 7

A developer's plans are submitted on electronic optical or magnetic media and integrated with existing regulatory data and video of the proposed area to 1) Verify plan compliance with City/State/Federal codes, and 2) Simulate how the proposed project if built, would appear, and impact the community, in the distant future.

EXAMPLE NO. 8

City planners utilize the system to design and update the city's land use plan. Transportation planners, storm water planners, etc., will visualize the land use plan concurrently during the design phase and assess impacts of the plan with regard to transportation, storm water, etc. Recommendations and manipulations can be made by the transportation planner, and again its impact visualized. This process allows for group interaction in city planning through the integration of existing city models and the visualization of model inputs and outputs.

It will be noted in the context of the above specification that the apparatus 10 has been described in terms of a city organization for illustrative purposes. Obviously the described system is appropriate for any type of entity organization, private or governmental.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What we claimed is:

1. A method for collecting and presenting natural and man-made geographical information comprising the steps of:

(a) acquiring factual natural and man-made geographical information on a real time basis;
   (b) identifying subject matter of the real time factual information;
   (c) ingesting and storing the identified factual information;
   (d) retrieving pre-existing factual geographical information of selected subject matter from a source;
   (e) correlating selected ingested information with corresponding retrieved information;
   (f) compiling the correlated information;
   (g) analyzing the compiled information to obtain simulation scenarios of the impact upon the factual information due to either actual or anticipated variations of the factual information; and
   (h) selectively presenting the compiled or analyzed information for review and study.

2. The method as set forth in claim 1 including the step of deleting any retrieved information commensurate with any ingested information to render most current the correlated information.

3. The method as set forth in claim 1 including the step of simulating in at least one other time dimension geographical information based upon the ingested and the retrieved information.

4. The method as set forth in claim 1 wherein said step of retrieving includes the step of using the retrieved geographical information and the ingested information to develop simulated geographical information in a predetermined time dimension.

5. The method as set forth in claim 1 wherein said step of presenting includes the step of imaging a selected one of the compiled information and the simulation scenarios in a visually perceivable format.

6. The method as set forth in claim 1 wherein said step of presenting includes the step of displaying the compiled information in more than one format.

7. The method as set forth in claim 1 wherein said step of correlating includes the step of creating different combinations of the ingested information and the retrieved information and wherein said step of compiling produces a plurality of compilations of information.

8. The method as set forth in claim 7 wherein said step of presenting includes presentation of the plurality of compilations.

9. The method as set forth in claim 1 wherein said step of presenting includes the step of displaying the projections resulting from said step of analyzing.

10. The method as set forth in claim 9 wherein said step of displaying includes the step of displaying the projections in more than one format.

11. The method as set forth in claim 1 including the step of simulating the effect upon the compiled information as a result of varying the factual information.

12. A method for collecting and presenting natural and man-made geographical information comprising the steps of:

(a) acquiring factual natural and man-made geographical information on a real time basis;
   (b) identifying subject matter of the real time factual information;
   (c) retrieving pre-existing factual geographical information of selected subject matter from a source;
   (d) correlating selected identified information with corresponding retrieved information;
   (e) analyzing the correlated information to obtain simulation scenarios of the impact upon the factual information due to either actual or anticipated future variations of factual information; and
   (f) selectively presenting the correlated and analyzed information.

13. The method as set forth in claim 12 wherein said step of correlating includes the step of replacing the retrieved information with corresponding acquired information to present up-to-date factual information.

14. The method as set forth in claim 12 wherein said step of correlating includes the step of compiling the correlated information in more than one time dimension.

15. The method as set forth in claim 13 wherein said step of correlating includes the step of compiling the correlated information in more than one time dimension.

16. The method as set forth in claim 12 wherein said step of presenting includes the step of imaging a selected one of the correlated information and the simulation scenarios in a visually perceivable format.

17. The method as set forth in claim 12 wherein said step of presenting includes the step of displaying the correlated information.

18. The method as set forth in claim 12 wherein said step of presenting includes the step of displaying-the projections resulting from said step of analyzing.

19. The method as set forth in claim 18 wherein said step of displaying includes the step of displaying the projections in more than one format.

20. The method as set forth in claim 12 including the step of simulating the effect upon the correlated information as a result of varying the factual information.

21. A method for projecting the affect on geographical information resulting from varying collected natural and man-made geographical information, said method comprising the steps of:

(a) acquiring factual natural and man-made geographical information on a real time basis;
   (b) identifying subject matter of the real time factual information;
   (c) ingesting and storing the identified factual information;
   (d) retrieving pre-existing factual geographical information of selected subject matter from a source;
   (e) correlating selected ingested information with corresponding retrieved information;

(f) varying selected parameters of the ingested factual information;

(g) compiling the correlated information and the varied information;

(h) analyzing the compiled information to obtain simulation scenarios of the impact resulting from the selected variations of the factual information; and (i) presenting the analyzed simulation scenarios for review and study.

22. A method for projecting the affect on geographical information resulting from varying collected natural and man-made geographical information, said method comprising the steps of:

(a) acquiring factual natural and man-made geographical information on a real time basis;

(b) identifying subject matter of the real time factual information;

(c) ingesting and storing the identified factual information;

(d) retrieving pre-existing factual geographical information of selected subject matter from a source;

(e) correlating selected ingested information with corresponding retrieved information;

(f) varying selected parameters of the acquired factual information;

(g) compiling the correlated information and the varied information;

(h) analyzing the compiled information to obtain simulation scenarios of the impact resulting from the selected variations of the factual information; and (i) presenting the analyzed simulation scenarios for review and study.

23. A method for projecting the affect on geographical information resulting from varying collected natural and man-made geographical information, said method comprising the steps of:

(a) acquiring factual natural and man-made geographical information on a real time basis;

(b) retrieving pre-existing factual geographical information of selected subject matter from a source;

(c) correlating selected identified information with corresponding retrieved information;

(d) varying selected parameters of the retrieved factual information;

(e) analyzing the correlated information to obtain simulation scenarios of the impact resulting from the selected variations of factual information; and (f) presenting the analyzed simulation scenarios.

24. A method for projecting the affect on geographical information resulting from varying collected natural and man-made geographical information, said method comprising the steps of:

(a) acquiring factual natural and man-made geographical information on a real time basis;

(b) retrieving pre-existing factual geographical information of selected subject matter from a source;

(c) correlating selected identified information with corresponding retrieved information;

(d) varying selected parameters of the acquired factual information;

(e) analyzing the correlated information to obtain simulation scenarios of the impact resulting from the selected variations of factual information; and (f) presenting the analyzed simulation scenarios.

* * * * *